(12) United States Patent
Lutzer et al.

(10) Patent No.: US 8,176,942 B2
(45) Date of Patent: May 15, 2012

(54) CLOSING DEVICE FOR A VACUUM USER SYSTEM OF AN AIRCRAFT

(75) Inventors: Wilhelm Lutzer, Zarpen (DE); Marc Scheel, Hamburg (DE)

(73) Assignee: Airbus Operations GmbH (DE)

( * ) Notice: Subject to any disclaimer, the term of this patent is extended or adjusted under 35 U.S.C. 154(b) by 1157 days.

(21) Appl. No.: 12/008,981

(22) Filed: Jan. 15, 2008

(65) Prior Publication Data
US 2008/0179561 A1    Jul. 31, 2008

Related U.S. Application Data

(60) Provisional application No. 60/880,670, filed on Jan. 16, 2007.

(30) Foreign Application Priority Data

Jan. 16, 2007   (DE) .......................... 10 2007 002 353

(51) Int. Cl.
*F16L 55/10*  (2006.01)
(52) U.S. Cl. ............... 138/89; 138/90; 138/92; 138/94; 220/234; 220/238
(58) Field of Classification Search .................... 138/89, 138/90, 92, 94; 220/234, 238
See application file for complete search history.

(56) References Cited

U.S. PATENT DOCUMENTS

| | | | |
|---|---|---|---|
| 2,822,108 A * | 2/1958 | Moeller ........................ 220/238 |
| 3,010,694 A * | 11/1961 | Lynch ........................... 251/189 |
| 3,087,641 A | 4/1963 | Millard |
| 3,747,541 A * | 7/1973 | Reese .............................. 109/50 |
| 3,954,123 A * | 5/1976 | Duckworth, Jr. ............. 137/800 |
| 4,083,468 A * | 4/1978 | Batchelor ...................... 220/234 |
| 4,086,670 A * | 5/1978 | Krause et al. ...................... 4/295 |
| 4,100,629 A | 7/1978 | Jones et al. |
| 4,188,675 A * | 2/1980 | Ast .................................... 4/295 |
| 4,301,629 A * | 11/1981 | Farr ................................. 52/99 |
| 4,415,005 A * | 11/1983 | Janzen ........................ 138/96 T |
| 5,083,727 A | 1/1992 | Pompei et al. |
| 5,230,437 A * | 7/1993 | Kelly ............................. 220/237 |
| 5,845,800 A * | 12/1998 | Shaw et al. ................... 220/210 |
| 2004/0187945 A1* | 9/2004 | Flanagan ........................ 138/89 |
| 2008/0092970 A1* | 4/2008 | Carnevali ........................ 138/89 |

* cited by examiner

*Primary Examiner* — James Hook
(74) *Attorney, Agent, or Firm* — Lerner, David, Littenberg, Krumholz & Mentlik, LLP

(57) ABSTRACT

A closing device for a vacuum user system or vacuum toilet system of an aircraft that makes it possible to quickly open and close a pipe connection piece in a vacuum user system or in a vacuum toilet system of an aircraft. The closing device comprises a cover; a closing element that can be inserted into the pipe connection piece and is connected to the cover by a spacer and is designed such that it substantially fully covers a cross section of the pipe connection piece; a sealing bellows located between the cover and the closing element and that at least partly encloses the spacer, wherein the sealing bellows comprises a sealing face; and an element that is movable in relation to the cover, which element is movable from a first position to a second position, wherein the movable element engages the sealing bellows such that the sealing face of the sealing bellows in the second position has a greater extension in a plane across the spacer than it does in the first position.

21 Claims, 4 Drawing Sheets

CLOSING DEVICE FOR A VACUUM USER SYSTEM OF AN AIRCRAFT

CROSS-REFERENCE TO RELATED APPLICATIONS

This application claims the benefit of the filing date of U.S. Provisional Patent Application No. 60/880,670 filed Jan. 16, 2007 and of German Patent Application No. 10 2007 002 353.9 filed Jan. 16, 2007 the disclosures of which are hereby incorporated herein by reference.

FIELD OF THE INVENTION

The present invention relates to a closing device for a vacuum user system or a vacuum toilet system of an aircraft, in particular to a closing device that makes it possible to quickly open and close a pipe connection piece in a vacuum user system or in a vacuum toilet system of an aircraft.

BACKGROUND OF THE INVENTION

In aircraft and in particular in commercial aircraft for passenger transport, according to the state of the art, vacuum toilet systems are used which during interior fitting of the aircraft, as a rule, are constructed and configured once only so as to be fixed.

Changes in utilisation of commercial aircraft, as far as the type of booked seats or of the cargo hold is concerned, may, however, require cabin reconfiguration that desirably also includes reconfiguration of sanitary installations. In order to keep down times of the commercial aircraft as short as possible as far as cabin reconfiguration is concerned, it is desirable to create systems that allow fast reconfiguration and great flexibility, both in relation to the seating arrangement and in relation to other systems, for example sanitary installations such as toilets.

Since, as a rule, the toilets are connected to a vacuum toilet system, up to now any reconfiguration that became necessary necessitated extensive installation measures which, during cabin reconfiguration, extended the downtimes or idle times of the commercial aircraft on the ground to uneconomically long periods.

SUMMARY OF THE INVENTION

There may be a need to provide a vacuum user system or vacuum toilet system for an aircraft, which vacuum user system or vacuum toilet system allows fast cabin reconfiguration, including reconfiguration of the toilet system.

According to an exemplary embodiment of the invention, a closing device for a pipe connection piece of a vacuum user system, in particular of a vacuum toilet system of an aircraft, is provided, wherein the closing device comprises: a cover; a closing element that can be inserted in the pipe connection piece, which closing element is connected to the cover by way of a spacer and is designed such that it essentially fully covers a cross section of the pipe connection piece; a sealing bellows that is located between the cover and the closing element and that at least partly encloses the spacer, wherein the sealing bellows comprises a sealing face and an element that is movable in relation to the cover, which element is movable from a first position to a second position, wherein the movable element engages the sealing bellows such that the sealing face of the sealing bellows in the second position has a greater extension in a plane across the spacer than it does in the first position.

At this point it should be mentioned that the present invention is applicable both to vacuum toilet systems and to vacuum user systems in general, for example to galley waste disposal units in aircraft etc., even if the following description only refers to a vacuum toilet system.

In this way a situation can be achieved in which a pipe connection piece of a vacuum toilet system, should said pipe connection piece not be required in the corresponding cabin configuration, can be closed off quickly and reliably without there being a need to reconfigure or substantially modify the pipe system of the toilet vacuum system itself. In this arrangement, by way of a sealing bellows, the closing device can be jammed in the pipe connection piece so as to provide a seal and so that the pipe connection piece is reliably closed providing a seal. If in some other cabin configuration the pipe connection piece is required again, it can be made accessible again by simply removing the closing device for the pipe connection piece, thus making it possible to achieve a fast and uncomplicated change in the cabin configuration also as far as the toilet system is concerned.

According to an exemplary embodiment of the invention, the closing element is arranged so as to be at a fixed distance from the cover. In this way it is possible, for example, to leave unchanged the geometry within a pipe system, in particular in a main pipe that extends across the pipe connection piece, even if as a result of a movement of a movable element the geometry of the sealing bellows is changed.

According to an exemplary embodiment of the invention, the cover is designed such that it rests against a rim of the pipe connection piece.

This prevents the closing device from being inserted too deeply into the pipe connection piece, which may adversely affect the interior geometry of the remaining pipe system. Furthermore, in this way the installation and the placement of the closing device is considerably simplified, in particular in the case of inexperienced or untrained installing personnel.

According to an exemplary embodiment of the invention, in the first position the sealing bellows is in a less pre-tensioned state than in the second position.

In this arrangement, moving the sealing bellows to the tensioned state can cause the sealing bellows to expand in a plane across the spacer, so that in this way adequate forces act on the sealing face in order to ensure proper sealing. In this context the expression "a plane across the spacer" means that it is not mandatory for the plane to be orthogonal in relation to the alignment of the spacer, but instead can also have any desired angle in relation to the axis of extension of the spacer, provided the axis of extension of the spacer is not in this plane.

According to an exemplary embodiment of the invention, in the second position the sealing bellows is in a less pre-tensioned state than in the first position.

Contrary to the embodiment described above, according to this embodiment the closing device can be pre-tensioned in the first position so that as a result of pre-tension, for example, the sealing face is pulled back so that the closing device can be inserted into the pipe connection piece, whereas when the closing device is relieved, the second sealing position is taken up.

According to an exemplary embodiment of the invention, in the second position the sealing bellows is in a more upset state than in the first position.

As a result of the upsetting of the sealing bellows, an expansion of the sealing bellows in a plane across the spacer is caused, which expansion exerts a force across the sealing face onto the wall of the pipe connection piece, so that reliable sealing action remains ensured. Upsetting can take place by pre-forming of the sealing bellows, in that said sealing bellows is in a tension-free state in the second position, and by being stretched moves to the first position. However, upsetting can also take place by taking up a pre-tensioned state in which the bellows is in the second position in a pre-tensioned manner as a result of the movable element.

According to an exemplary embodiment of the invention, the sealing bellows is upset or is being upset between the cover and the movable element.

In this way the closing element can be held at a fixed distance in relation to the cover, so that as a result of the movable element and the ensuing upsetting or stretching of the sealing bellows with the associated change in the position of the movable element, the geometry that is formed by the closing element and the pipe system is kept unchanged.

According to an exemplary embodiment of the invention, the sealing bellows is upset or is being upset or stretched between the movable element and the closing element.

In this way the bellows between the moving element and the closing element, from a state in which said bellows is clamped to the pipe connection piece, by stretching can be made to taper off between the movable element and the closing element in order to remove the closing device from the pipe connection piece.

According to an exemplary embodiment of the invention, in relation to negative pressure acting on the side of the closing element, the sealing bellows comprises a sealing-enhancing geometry.

This can, for example, be achieved by arranging sealing beads or sealing faces such that the vacuum acting on the sealing bellows deforms said sealing bellows such that, as a result of the vacuum, the already mentioned sealing face or also additional sealing faces are pressed against the wall of the pipe connection piece so that the sealing effect, i.e. the sealing action between the closing device and the pipe connection piece, further increases if a vacuum is present in the vacuum toilet system.

According to an exemplary embodiment of the invention, the movable element is movable from the first to the second position by means of a lever engaging the cover.

This lever makes it possible to activate the movable element in a simple and practicable manner, and in addition makes it possible to optimise the force that has to be exerted in order to move the movable element from the first to the second position and back. The lever, or a lever arrangement, can, for example, comprise a cam that, for example, comprises two metastable states, one in the first position and one in the second position, so that as a result of a corresponding lever position the movable element independently remains in the corresponding first or second position, rather than independently falling back to the respective other position. This can also be achieved or reinforced by means of catches. As an alternative, the lever arrangement can, however, also be provided such that it is automatically moved to one of the two positions by means of a tension spring, which can also be functionally represented by the elasticity of the sealing bellows, in order to allow swift and fast installation or deinstallation of the closing device.

According to an exemplary embodiment of the invention, the closing device comprises an antirotational device in order to insert the closing device in an antirotational manner relative to the pipe connection piece.

In this way it is ensured that sealing of a non rotationally symmetric pipe connection piece is nevertheless reliably ensured, for example in an asymmetrical closing device, because in this way it is reliably ensured that the closing element does not project into the free pipe cross section, which would have a negative effect on the flow in the pipe system. Such an antirotational device can, for example, be realised by an elevation that engages an indentation or vice versa, for example by a type of fork which during proper positioning provides a grip around a pipe that extends across the pipe connection piece.

According to an exemplary embodiment, the lever can act as an antirotational device.

In this way it can be ensured that, for example, the lever can be placed to the sealing position only if the closing device is positionally accurately positioned in the pipe connection piece. To this effect the lever can, for example, comprise a fork that provides a grip around a pipe that extends across the pipe connection piece, for example when the lever is in a position that corresponds to the second sealing position of the movable element.

According to an exemplary embodiment of the invention, the sealing bellows completely encloses the spacer.

In this way the spacer, which can, for example, also act as a guide for the movable element, can be kept free of dirt build-up and the like, and numerous edges and undercuts can be avoided.

According to an exemplary embodiment of the invention, the sealing bellows is connected, in one piece in a gas-proof and liquid-proof manner, to the cover and to the closing element.

In this way dirt build-up can be avoided, and optimal sealing of the pipe connection piece can be achieved. The expression "gas-proof and liquid-proof" refers to the direction towards the inside of a pipe opening that is to be sealed off.

According to an exemplary embodiment of the invention, the sealing bellows essentially takes up the space in the region between the cover and the closing element.

In this way no hollow spaces remain in which dirt particles and the like can lodge; a factor that is important in particular in the case of wastewater systems for toilets in view of maintaining good hygiene.

According to an exemplary embodiment, the sealing bellows comprises an elastomer.

Elastomers are highly flexible materials that in addition comprise good sealing characteristics, even at comparatively low temperatures.

According to an exemplary embodiment of the invention, the closing element comprises a shape that faces away from the cover, which shape closes a pipe, from which pipe the pipe connection piece branches off, off from the pipe connection piece such that the closing element, together with the pipe, in the region of the mouth of the pipe connection piece, is given a shape that essentially corresponds to the shape of a pipe wall section on which there is no mouth of a pipe connection piece.

In this way the mouth region of a pipe or pipe system, in which mouth region the pipe connection piece joins, is closed such that the interior contour of the pipe is not impeded by the closed pipe connection piece, and the geometry essentially remains homogeneous within the pipe system such that there are no edges and undercuts on which dirt particles and the like could lodge.

According to an exemplary embodiment, the closing element comprises a shape that faces away from the cover, which shape corresponds to the pipe section of a pipe with a circular, elliptic or oval cross section.

Since, as a rule, waste water pipes are round or oval, the shape of the corresponding closing element can correspondingly match the shape of the pipe wall so that the closing element corresponds to a corresponding pipe section.

According to an exemplary embodiment, a toilet system for an aircraft is provided which comprises a pipe arrangement with at least one pipe connection piece as well as a closing device according to the invention.

Likewise, a plural number of pipe connection pieces can be provided on the vacuum toilet system, wherein the plural number of pipe connection pieces essentially have identical dimensions, so that during installation of the pipe closing devices it is not necessary to pay attention to a corresponding allocation of a special closing device to a special pipe connection piece.

According to an exemplary embodiment, an aircraft with a vacuum toilet system according to the invention is provided.

It is understood that the exemplary embodiments of the invention that have been described above and that will be described below relate to the closing system, to the vacuum toilet system and to the airplane or aircraft comprising such a vacuum toilet system.

Furthermore, it should be noted that the individual features described above can also be combined where an average person skilled in the art considers such a combination to be sensible.

These and other aspects of the present invention are explained in and become clear from the exemplary embodiments that are described in detail below.

BRIEF DESCRIPTION OF THE DRAWINGS

Below, exemplary embodiments of the present invention are described with reference to the following drawings.

Figure 1:
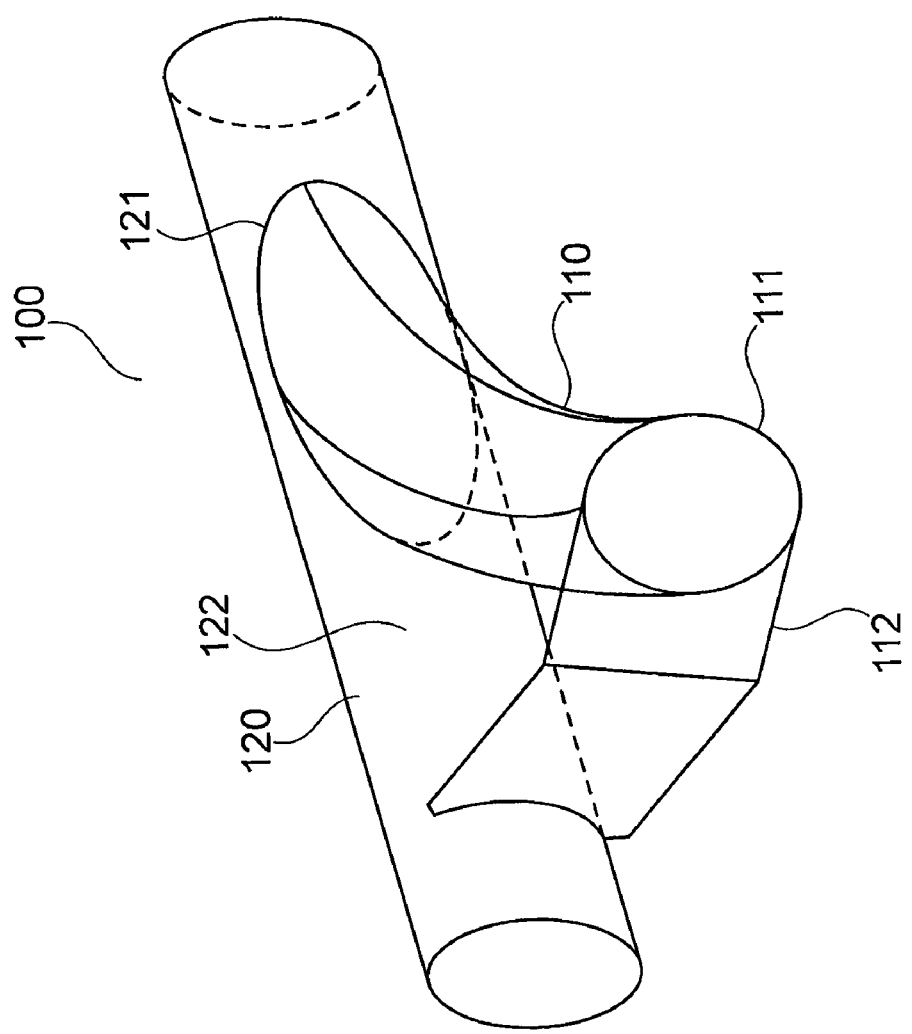
FIG. 1 shows a pipe system comprising a pipe and a pipe connection piece.

It is understood that the reference characters used are not limiting but instead are merely used for illustrative purposes.

DETAILED DESCRIPTION

At this point it should be mentioned that the following description of exemplary embodiments refers both to the use with reference to vacuum toilet systems and with reference to vacuum consumer systems in general, even if the following description only explicitly refers to a vacuum toilet system.

FIG. 1 shows a perspective view of a pipe 120 of a vacuum toilet system 100 with a branching-off pipe connection piece 110. The pipe connection piece has a curved shape but it can also have a straight shape. In FIG. 1 the pipe connection piece is shown such that it leads into the pipe 120 at an inclined angle; of course, the pipe connection piece 110 can also meet the pipe 120 perpendicularly. If at all possible, the mouth region 121 should not comprise any edges, so that dirt particles and the like cannot lodge. The pipe connection piece can comprise a support 112 in order to stabilise the pipe connection piece 110 on the pipe 120.

A closing device 1 can be inserted in the pipe connection piece 110, which closing device 1, for example, closes the pipe connection piece 110 off such that the interior contour of the pipe 120 in the region of the mouth region 121 as a result of the closing element 50 comprises a contour of the type that essentially corresponds to a wall section 122 of the pipe 120 on which there is no mouth of a pipe connection piece 110. In the case of a pipe with a circular or oval cross section, for example, the closing element 50 is, for example, in the shape of a pipe section with a circular or oval cross section. If the pipe connection piece meets the pipe in a bend of the pipe, then the closing element is, for example, bent in two dimensions, for example as a section of a circle, of an ellipsoid, of a hyperboloid, for example if it meets the interior of a flexural buckle or an ovaloid shape.

Figure 2:
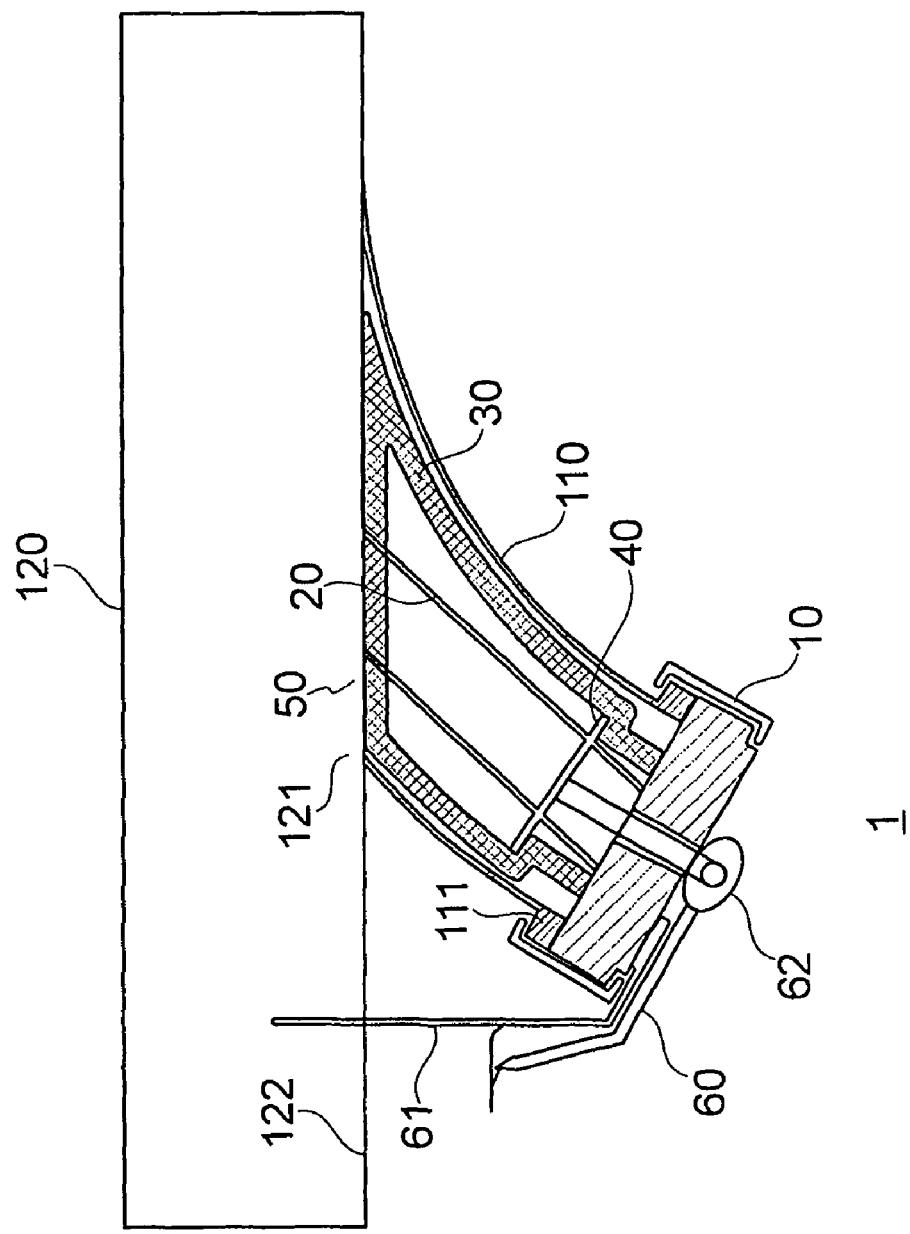
FIG. 2 shows a sectional view of a pipe with a pipe connection piece which comprises a closing device according to an exemplary embodiment of the invention.

FIG. 2 shows a closing device 1 according to an exemplary embodiment of the invention, which closing device 1 has been placed in the pipe connection piece 110. In this arrangement the rim or the edge 111 of the pipe connection piece can be inclined in relation to the alignment of the pipe connection piece.

The closing device shown in FIG. 2 comprises a cover 10, which by way of a spacer 20 comprises a closing element 50, which in the embodiment shown in FIG. 2 closes off the connection region 121 of the pipe connection piece 110 such that the connection region 121 of the pipe 120 together with the closing element 50 comprises a contour that corresponds to a wall section 122 of the pipe 120 on which no pipe connection piece 110 meets.

Furthermore, the closing device 1 comprises a sealing bellows 30 as well as a movable element 40 that engages the sealing bellows 30 such that the sealing bellows is deformed when the movable element 40 is moved from a first position to a second position. FIG. 2 shows, for example, the first position, in which the sealing bellows 30 is not yet upset such that it has undergone deformation. In this arrangement the movable element 40 can be slidably held to the spacer 20, wherein the spacer 20 can then be used as a guide rail for the movable element 40. It is not mandatory for the spacer 20 to be affixed perpendicularly to the cover area of the cover 10; instead it can be affixed so as to be inclined in relation to the cover area of the cover 10, which makes sense in particular in cases where the pipe connection piece 110 has a strong bend, and where the rim 111 of the pipe connection piece 110 is inclined in relation to the alignment of the pipe connection piece 110. The spacer can also be bent, wherein in this case the movable element describes a movement along the bend of the spacer. Correspondingly asymmetrical upsetting can provide an optimal sealing geometry in the case of a bent pipe connection piece.

In the exemplary embodiment shown in FIG. 2 the sealing bellows takes up essentially the entire space between the closing element 50 and the cover 10. By means of the spacer 20 the closing element 50 can be kept at a fixed distance to the cover 10, wherein the closing element 50 can be inclined both towards the spacer 20 and towards the cover 10, in particular when the pipe connection piece does not lead into the pipe 120 in an orthogonal manner. In the embodiment shown in FIG. 2 the sealing bellows 30 is connected in one piece to the closing element 50 and to the cover 10. However, this does not mandatorily mean that the cover 10, the closing element 50 and the sealing bellows 30 are made from the same material; instead, with the use, for example, of a thermoplastic elastomer, an elastomer can, for example, be injection moulded to a solid plastic or to a metal such that the elastomer is connected in one piece to the solid plastic or to the metal.

The spacer 20 can either be made of several stays or it can be made of a one-piece element.

In this arrangement the movable element 40 can be moved from a first position to a second position by means of a lever or a lever mechanism 60. The lever mechanism can, for example, comprise one or two metastable states, in which the lever is metastable in a corresponding position, without jumping back to the respective other position. In the arrangement shown in FIG. 2, the lever 60 is in a metastable home position in which the movable element 40 is not in a position in which the sealing bellows 30 is upset, so that a sealing state of the closing device 1 in the pipe connection piece 110 has not yet been reached. The lever mechanism can, for example, comprise a cam 62, which makes possible comfortable actuation of the lever and of the movable element 40.

Furthermore, an antirotational device 61 can be provided, which makes it possible to place the closing device 1 in the pipe connection piece 110 only in a predetermined position and alignment. Furthermore, it is possible for the lever 60 and for the antirotational device 61 to be functionally connected in one element so that the lever can be moved to a particular position, for example the sealing position, only after completion of the alignment of the closing device 1 in relation to the pipe connection piece 110 in the predetermined manner. This can, for example, take place by means of a fork on the lever, which fork grips, with positive fit, the circumference of a pipe that extends across the pipe connection piece only when the closing device has been inserted in a positionally accurate manner into the pipe connection piece.

The closing device can, for example, be used with a pipe connection piece or a connection piece for a 2 inch vacuum toilet system on board an aircraft, in order to thus make it possible to achieve fast cabin reconfiguration without the need to deinstall the main pipe arrangement. In this arrangement those connection positions that are required or are no longer required can conveniently be opened or closed, or activated or deactivated.

A closing device according to the invention thus makes it possible to close off a through-opening to the main pipe by means of a solid closing device with as precise a fit as possible, with such closing-off, for example, preserving the shape. As shown in FIG. 2, the pipe stub that is situated behind is filled in with an elastomer body so as to be flush, as far as possible, with the pipe wall. On the other end of the closing device there is the cover in the form of a stop cover that is firmly connected to the closing element in the form of a tightly fitting cover in the through-opening. In this arrangement the spacer 20 can act as a guide device that aligns the closing device in the branch pipe or of the pipe connection piece such that the smallest possible interference in relation to flow behaviour arises in the main pipe at the location of the through-opening.

The elastomer body can be designed such that in its home position it rests flush against the inside of the pipe connection piece and is pressed against it. In order to move the closing device into position or in order to remove it therefrom, according to one embodiment the elastomer body can be stretched and thus tapered, for example by way of a tension lever or a quick-action tension lever, so that said elastomer body loses the close contact to the interior of the pipe and can easily be moved. Likewise, the tension lever can also be designed such that the elastomer body or the sealing bellows 30 has a sealing effect in the tensioned position and can be inserted into the pipe connection piece in the tension-free position.

Contact pressure on the interior wall of the pipe connection piece can be generated by artificial or by natural contact pressure.

Figure 3:
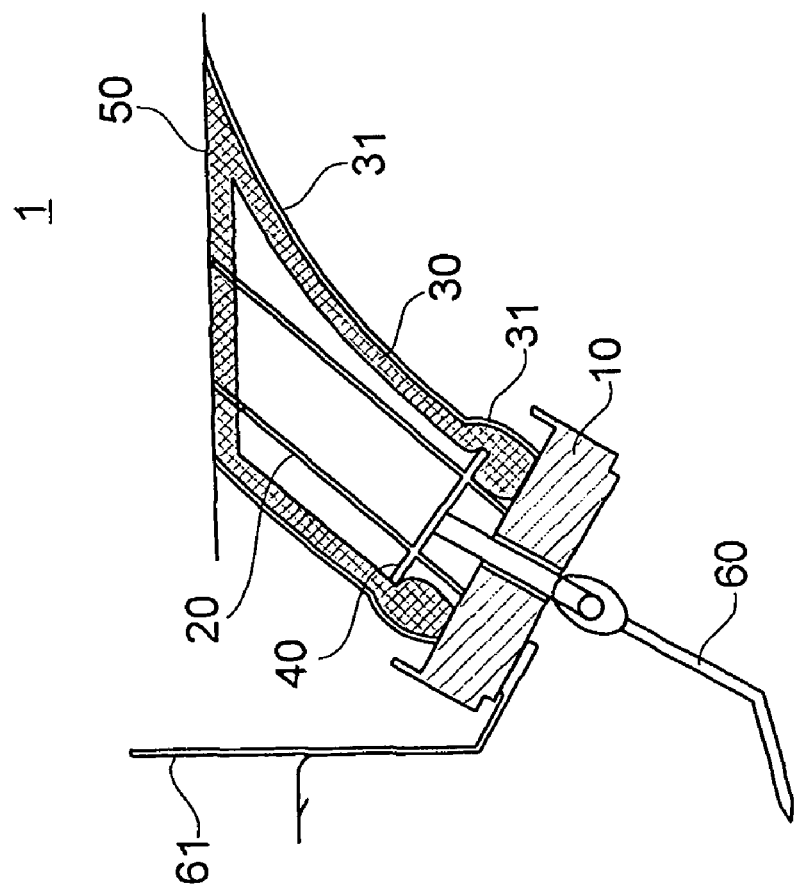
FIG. 3 shows a sectional view of a closing device according to an exemplary embodiment of the invention.

FIG. 3 shows an exemplary embodiment of the closing device in its non-installed state, in which the lever 60 is moved to such a position in which the movable element 40 has deformed the sealing bellows 30 in a second position such that said sealing bellows has increased its expansion in a plane across the spacer 20, so that the sealing face 31 at the position of the larger expansion can engage the wall of the pipe connection piece 110 so as to provide a tight seal.

Of course, the lever mechanism in its interaction with the movable element 40 can also be provided such that in its relocated state the lever causes upsetting of the sealing bellows 30 by means of the movable element 40 and in this way a sealing state is achieved when the lever 60 is correspondingly in its relocated state where it does not protrude into the surrounding space but instead rests against the antirotational device 61.

Furthermore, the closing device can also be designed such that the sealing bellows 30 is in a sealing state in its home position, and that a changeover from the sealing state is achieved by means of a corresponding movement and deformation by moving the lever 60 of the folding bellows; and that during corresponding relieving, in the home position of the sealing bellows 30, the sealing state is assumed again, so that, for example, for the purpose of insertion into the pipe connection piece 110 the sealing bellows 30 is stretched such that, for improved insertion of the closing device 1 into the pipe connection piece, the expansion of the sealing face 31 is reduced, while during relaxation and return to the home position the sealing bellows 30 assumes a sealing state.

Figure 4:
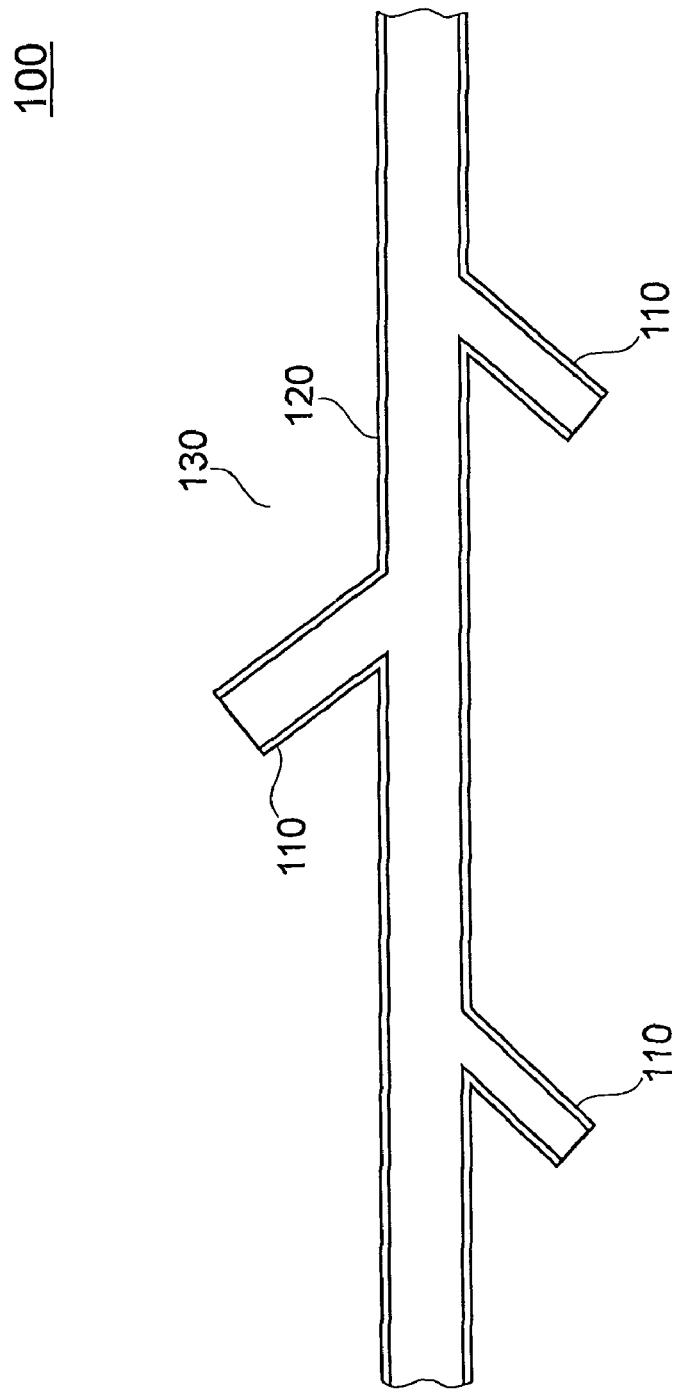
FIG. 4 shows a pipe system comprising a plural number of pipe connection pieces.

FIG. 4 shows a diagrammatic design of a vacuum toilet system 100 with a pipe 120 that comprises a plural number of pipe connection pieces 110 of essentially identical dimensions. In this arrangement it is immaterial as to whether the pipe connection pieces are inclined in one direction or the other.

The object of the invention can, of course, also be used in other vacuum toilet systems and other vacuum systems and is neither limited to application in an aircraft nor to application in toilets. For example, a toilet system according to the invention, or a closing system according to the invention, can also be used in trains or in other vehicles such as buses, in particular where there is a need for fast cabin reconfiguration.

Moreover, it should be understood that it is not only individual closing devices but also a plural number of closing devices that can be provided with corresponding openings in a pipe arrangement, so that it is also possible to connect a plural number of vacuum toilets to such a vacuum toilet system.

It should be pointed out that the term "comprising" does not exclude other elements and arrangements, and "a" or "one" does not exclude a plural number.

Furthermore, it should be pointed out that reference characters in the claims are to be interpreted purely as being explanatory, but in no way as being limiting.

The invention claimed is:

1. A closing device for a pipe connection piece of a vacuum user system comprising:
   a cover;
   a closing element;
   a sealing bellows; and
   an element,
   wherein the closing element is insertable into the pipe connection piece and is connected to the cover by a spacer and substantially fully covers a cross section of the pipe connection piece;
   wherein the sealing bellows is located between the cover and the closing element and at least partly encloses the spacer, wherein the sealing bellows comprises a sealing face;
   wherein the element is movable in relation to the cover, and is movable from a first position to a second position, wherein the movable element engages the sealing bellows such that the sealing face of the sealing bellows in the second position has a greater extension in a plane across the spacer than it has in the first position; and wherein the closing element is arranged so as to be at a fixed distance from the cover.

2. The closing device of claim 1, wherein the cover is designed such that it rests against a rim of the pipe connection piece.

3. The closing device of claim 1, wherein in the first position the sealing bellows is in a less pre-tensioned state than in the second position.

4. The closing device of claim 1, wherein in the second position the sealing bellows is in a less pre-tensioned state than in the first position.

5. The closing device of claim 1, wherein in the second position the sealing bellows is in a more upset state than in the first position.

6. The closing device of claim 1, wherein the sealing bellows is upset or is being upset between the cover and the movable element.

7. The closing device of claim 1, wherein the sealing bellows is upset or is being upset between the movable element and the closing element.

8. The closing device of claim 1, wherein in relation to negative pressure acting on the side of the closing element, the sealing bellows comprises a sealing-enhancing geometry.

9. The closing device of claim 1, wherein the movable element is movable from the first to the second position by a lever engaging the cover.

10. The closing device of claim 9, wherein the lever acts as an antirotational device.

11. The closing device of claim 1, wherein the closing device comprises an antirotational device in order to insert the closing device in an antirotational manner relative to the pipe connection piece.

12. The closing device of claim 1, wherein the sealing bellows completely encloses the spacer.

13. The closing device of claim 1, wherein the sealing bellows is connected, in one piece in a gas-proof manner, to the cover and to the closing element.

14. The closing device of claim 1, wherein the sealing bellows substantially takes up the space in the region between the cover and the closing element.

15. The closing device of claim 1, wherein the sealing bellows comprises an elastomer.

16. The closing device of claim 1, wherein the closing element comprises a shape that faces away from the cover which shape closes a pipe, from which pipe the pipe connection piece branches off, off from the pipe connection piece such that the closing element, together with the pipe, in the region of the mouth of the pipe connection piece, is given a shape that substantially corresponds to the shape of a pipe wall section on which there is no mouth of a pipe connection piece.

17. The closing device of claim 1, wherein the closing element comprises a shape that faces away from the cover, which shape corresponds to the pipe section of a pipe with a circular, elliptic or oval cross section.

18. A vacuum user system for an aircraft, comprising:
a pipe arrangement with at least one pipe connection piece, and
a closing device comprising
a cover;
a closing element;
a sealing bellows; and
an element,
wherein the closing element is insertable into the pipe connection piece and is connected to the cover by a spacer and substantially fully covers a cross section of the pipe connection piece;
wherein the sealing bellows is located between the cover and the closing element and at least partly encloses the spacer, wherein the sealing bellows comprises a sealing face;
wherein the element is movable in relation to the cover, and is movable from a first position to a second position, wherein the movable element engages the sealing bellows such that the sealing face of the sealing bellows in the second position has a greater extension in a plane across the spacer than it has in the first position; and
wherein the closing element is arranged so as to be at a fixed distance from the cover.

19. The vacuum user system of claim 18, wherein a plural number of pipe connection pieces are provided on the vacuum toilet system.

20. The vacuum user system of claim 18, wherein the plural number of pipe connection pieces have substantially identical dimensions.

21. An aircraft comprising a vacuum user system, the vacuum user system comprising:
a pipe arrangement with at least one pipe connection piece, and
a closing device comprising
a cover;
a closing element;
a sealing bellows; and
an element,
wherein the closing element is insertable into the pipe connection piece and is connected to the cover by a spacer and substantially fully covers a cross section of the pipe connection piece;
wherein the sealing bellows is located between the cover and the closing element and at least partly encloses the spacer, wherein the sealing bellows comprises a sealing face;
wherein the element is movable in relation to the cover, and is movable from a first position to a second position, wherein the movable element engages the sealing bellows such that the sealing face of the sealing bellows in the second position has a greater extension in a plane across the spacer than it has in the first position; and
wherein the closing element is arranged so as to be at a fixed distance from the cover.

* * * * *